3,370,106
HOT MELT ADHESIVE CONTAINING ATACTIC POLYPROPYLENE AND POLYETHYLENE
Lewis W. Hall, Jr., and Jackson S. Boyer, Claymont, Del., and Richard E. Ware, Trainer, Pa., assignors to Sun Oil Company, Philadelphia, Pa., a corporation of New Jersey
No Drawing. Filed Mar. 23, 1965, Ser. No. 442,174
3 Claims. (Cl. 260—897)

ABSTRACT OF THE DISCLOSURE

A hot melt adhesive composition, which is suitable for bonding two materials together such as a corrugated paper medium and a 50-pound kraft paper facer sheet to product corrugated paper board, composed essentially of 60–95 weight percent atactic polypropylene and 5–40 weight percent polyethylene. The atactic polypropylene should have a molecular weight in the range of 15,000 to 60,000 and the polyethylene should have a melt index of 2–10.

This invention relates to hot melt adhesive compositions. In particular, it relates to hot melt adhesive compositions having high performance properties which are prepared from low-cost ingredients.

Hot melt adhesives produce a bond by simple cooling as distinguished from cross-linking or other chemical reactions. Prior to heating, the adhesives are thermoplastic solid materials. Upon heating, they melt rather sharply and flow freely, and they can be remelted after cooling. The fact that hot melts are remeltable makes it possible to apply them to a substrate at one time and to remelt them and form the adhesive bond later.

Hot melt adhesives are used for bonding wood, paper, plastics, textiles and other materials. A particular use is in the fabrication of paper cartons. Hot melts for container board must have high bond strength under conditions of shock, high humidity and temperature extremes encountered in transportation and storage encountered by paper cartons. In addition, melt point, setting time, pot life and general handling qualities on corrugators and in automatic box making machinery are essential requirements.

We have found that the object of providing a high performance, low-cost, hot melt adhesive can be obtained by blending together atactic polypropylene and a minor proportion of a different polymer selected from the group consisting of isotactic polypropylene and polyethylene. The compositions of the invention have excellent properties for bonding materials, particularly paper. In addition, the compositions of the invention have light color making them desirable for applications where clarity is important, such as, for example, seals on cellophane or plastic coverings.

The atactic (essentially non-crystalline) polypropylene is formed during the stereospecific polymerization of propylene. The polymerization takes place in the presence of a catalyst comprising a coordination complex of a transition metal halide with an organometallic compound. The atactic polypropylene usually represents from about 5 to 15 weight percent of the polymerization product, the remainder being isotactic (essentially crystalline) polypropylene. The solid atactic polypropylene suitable for the composition of the invention has a molecular weight of 15,000 to 60,000 and more particularly from 16,000 to 20,000. It is soluble in boiling pentane, hexane, heptane and other hydrocarbons.

In one known process, the polymerization product in the reaction medium is contacted with a solvent consisting of methanol and water to kill the catalyst. The catalyst is then removed in solution leaving a heptane slurry. The atactic polypropylene is in solution in the heptane, and this solution is removed from the isotactic polymer. The solution is distilled to recover the heptane solvent which is recycled. The solid material which remains after stripping the hexane is the atactic polypropylene employed in the compositions of this invention. Suitable atactic polypropylene is available commercially, such as "Oletac 100" produced by Avisun Corporation.

TABLE I

Properties of oletac 100 employed

Molecular wt. _____ 16,000 to 20,000.
Viscosity cp. at 300° F. _____ 4,200 to 5,840.
Ring & Ball, ° C. _____ 115 to 125.
Intrinsic viscosity [n] _____ .28.

The isotactic (essentially crystalline) polypropylene employed in the composition of the invention may be that produced in the process set out above. Generally, such isotactic polymers have molecular weight of up to and beyond 500,000. Isotactic polypropylene is insoluble in boiling pentane, hexane and heptane, thus, facilitating the separation of the atactic and isotactic polymers. The molecular weight of isotactic polypropylene found particularly suitable for the composition of the present invention is 85,000 to 95,000.

The polyethylene employed in the present invention is well known in the art. Suitable polyethylene has a ring and ball softening point of about 115° C. to about 120° C. and MI (melt index) values of 2 to 10 (ASTM D 1238–62T). The preparation of polyethylene is described in many patents including U.S. Patent No. 2,377,779 and U.S. Patent No. 2,396,785 and in the literature, see for example, Golding, Polymers and Resins, D. Van Norstrand Company, Inc. (New York, 1959), pages 374 to 387.

The compositions of the invention preferably contain 75 to 95 wt. percent atactic polypropylene and 5 to 25 wt. percent of the isotactic polypropylene or polyethylene. Compositions containing up to 40 wt. percent isotactic polypropylene or polyethylene have been prepared and evaluated. Although these latter compositions were found to give satisfactory tear seals and delamination results, they are not entirely suitable because of their high viscosity. Whereas the 5 to 25 wt. percent compositions have a viscosity at 300° F. that allows for economical and rapid application of the adhesives to substrates, the 40 wt. percent compositions require temperature around 365° F. to achieve the operational viscosities.

The hot melt adhesive is made by thoroughly mixing the ingredients at a temperature in the range of 200° F. to 480° F. Although the compositions described herein were prepared with a Sigma blade mixer, they may be prepared by any suitable means.

For application to a surface, the adhesive is heated to a temperature in the range of 250° F. to 365° F. and applied to one of the surfaces which are to be joined.

The hot melt adhesives compositions were screened by two simple tests with kraft paper.

The first test is the tear seal test. The sample is made on 50-pound kraft paper cut into 1 by 6 inch strips. One strip is coated on a single side for a length of two inches with a 1 to 2 mil coating of hot adhesive and another strip is placed over the first strip. The sample then consists of two layers of paper bonded together on internal surfaces over a two square inch area at one end. The test is made gy gripping the free ends of the strips and pulling slowly in opposite directions perpendicular to the bond. A tear seal is indicated when there is a failure in the substrate (in this case kraft paper) and no failure in the adhesive bond. The test is conducted at ambient temperature and −25° F. The latter temperature is used to test for brittleness at the most severe low temperature service conditions the bond might be expected to encounter.

The second is the delamination test. This test is made by forming a 2-inch lap joint with 1 by 6-inch, 50-pound, kraft paper strips. The sample is joined by a two square inch area of adhesive having a thickness of 1 to 2 mils. The total length of the sample is 10 inches. The strip is suspended in a 150° F. oven for one-half hour. There should be no indication of the paper substrates parting in order to pass the test.

The following examples are intended to illustrate the invention, not to limit its scope.

EXAMPLE I

In a Sigma blade mixer at about 302° F., 90 grams of atactic polypropylene (Oletac 100) containing 1 gram of 2,6-di-tert-butyl-4-methyl phenol, antioxidant, were blended with 10 grams of isotactic polypropylene until a homogeneous mixture was obtained. The temperature was then raised to 460° F. with continued blending to obtain a homogeneous melt. The hot adhesive was applied to 50-pound kraft paper and subjected to the test set out above. The compositions gave a good tear seal at room temperature and at −25° F. No delamination was observed at 150° F. after one-half hour.

EXAMPLE II

In a Sigma blade mixer at about 259° F., 80 grams of atactic polypropylene (Oletac 100) containing 0.8 gram BHT antioxidant were blended with 20 grams of polyethylene until a homogeneous mixture was obtained. The temperature was then raised to 383° F. to form a homogeneous melt, which was applied to kraft paper and tested. The composition gave satisfactory tear seals at room temperature and at −25° F. and showed no delamination at 150° F. after one-half hour.

The adhesive compositions of the present invention can contain functional materials such as plasticizers, tackifiers, fillers, solvents, thinners, antioxidants and coloring agents.

The invention claimed is:

1. A thermoplastic hot melt adhesive composition consisting essentially of a homogeneous mixture of 60 to 95 wt. percent atactic polypropylene having a molecular weight of 15,000 to 60,000 and 5 to 40 wt. percent of polyethylene having a melt index of 2 to 10.

2. A thermoplastic hot melt adhesive composition consisting essentially of a homogeneous mixture of 75 to 95 wt. percent atactic polypropylene having a molecular weight of 15,000 to 60,000 and 5 to 25 wt. percent of polyethylene having a melt index of 2 to 10.

3. A thermoplastic hot melt adhesive composition consisting essentially of a homogeneous mixture of 75 to 95 wt. percent atactic polypropylene having a molecular weight of 16,000 to 20,000 and 5 to 25 wt. percent polyethylene having a melt index of 2 to 10.

References Cited

UNITED STATES PATENTS

| | | | |
|---|---|---|---|
| 3,112,300 | 11/1963 | Natta et al. | 260—897 |
| 3,220,966 | 11/1965 | Flanagan | 260—897 |
| 3,230,186 | 1/1966 | Kreibich et al. | 260—892 |

GEORGE F. LESMES, *Primary Examiner.*

MURRAY TILLMAN, *Examiner.*

T. G. FIELD, *Assistant Examiner.*